(12) United States Patent
Gist, IV et al.

(10) Patent No.: US 12,353,216 B2
(45) Date of Patent: *Jul. 8, 2025

(54) REMOVABLE AUTOMOTIVE LIDAR DATA COLLECTION POD

(71) Applicant: Aurora Operations, Inc., Pittsburgh, PA (US)

(72) Inventors: Nathaniel Gist, IV, Pittsburgh, PA (US); Christopher Williams, Pittsburgh, PA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,554

(22) Filed: May 21, 2024

(65) Prior Publication Data

US 2024/0310837 A1   Sep. 19, 2024

Related U.S. Application Data

(63) Continuation of application No. 18/195,341, filed on May 9, 2023, now Pat. No. 12,007,781, which is a
(Continued)

(51) Int. Cl.
*G05D 1/02* (2020.01)
*B60R 11/04* (2006.01)
(Continued)

(52) U.S. Cl.
CPC ............ *G05D 1/0231* (2013.01); *B60R 11/04* (2013.01); *G05D 1/027* (2013.01); *G05D 1/0276* (2013.01);
(Continued)

(58) Field of Classification Search
CPC .... G05D 1/0231; G05D 1/027; G05D 1/0276; G05D 1/0278; G05D 1/245; G05D 1/247;
(Continued)

(56) References Cited

U.S. PATENT DOCUMENTS 6,175,799 B1    1/2001  Tsutsumi et al.
6,322,275 B1   11/2001  Schmidt
(Continued)

FOREIGN PATENT DOCUMENTS

CN    205395966    7/2016
CN    113287039    8/2021
(Continued)

OTHER PUBLICATIONS

European Patent Office; Communication Pursuant to Article 94(3) issued for Application No. 19722303.5, 6 pages, dated Feb. 8, 2023.
(Continued)

*Primary Examiner* — Calvin Cheung
(74) *Attorney, Agent, or Firm* — Gray Ice Higdon

(57) ABSTRACT

A vehicle agnostic removable pod can be mounted on a vehicle using one or more legs of a pod mount. The removable pod can collect and time stamp a variety of environmental data as well as vehicle data. For example, environmental data can be collected using a sensor suite which can include an IMU, 3D positioning sensor, one or more cameras, and/or a LIDAR unit. As another example, vehicle data can be collected via a CAN bus attached to the vehicle. Environmental data and/or vehicle data can be time stamped and transmitted to a remote server for further processing by a computing device.

18 Claims, 7 Drawing Sheets

Related U.S. Application Data continuation of application No. 17/516,240, filed on Nov. 1, 2021, now Pat. No. 11,681,298, which is a continuation of application No. 16/271,355, filed on Feb. 8, 2019, now Pat. No. 11,163,312.

(60) Provisional application No. 62/755,167, filed on Nov. 2, 2018.

(51) Int. Cl.
| | |
|---|---|
| G05D 1/00 | (2006.01) |
| G05D 1/245 | (2024.01) |
| G05D 1/247 | (2024.01) |
| G05D 1/248 | (2024.01) |
| G05D 1/249 | (2024.01) |
| G06F 13/42 | (2006.01) |
| B60R 11/00 | (2006.01) |

(52) U.S. Cl.
CPC ........... *G05D 1/0278* (2013.01); *G05D 1/245* (2024.01); *G05D 1/247* (2024.01); *G05D 1/248* (2024.01); *G05D 1/249* (2024.01); *G06F 13/4282* (2013.01); *B60R 2011/004* (2013.01); *B60R 2011/0068* (2013.01); *B60R 2011/007* (2013.01); *G06F 2213/0002* (2013.01)

(58) Field of Classification Search
CPC .......... G05D 1/248; G05D 1/24; B60R 11/04; B60R 2011/004; B60R 2011/0068; B60R 2011/00; G06F 13/4282; G06F 2213/00; G01S 17/86; G01S 7/4813; G01S 17/931
See application file for complete search history.

(56) References Cited

U.S. PATENT DOCUMENTS

| | | |
|---|---|---|
| 8,849,494 B1 | 9/2014 | Herbach et al. |
| 8,866,906 B1 | 10/2014 | Abad |
| 9,020,680 B2 | 4/2015 | Solyom et al. |
| 9,606,539 B1 | 3/2017 | Kentley et al. |
| 9,734,455 B2 | 8/2017 | Levinson et al. |
| 9,940,834 B1 | 4/2018 | Konrardy et al. |
| 10,007,269 B1 | 6/2018 | Gray |
| 10,037,613 B1 | 7/2018 | Becker et al. |
| 10,514,462 B2 | 12/2019 | England et al. |
| 10,676,085 B2 | 6/2020 | Smith et al. |
| 11,163,312 B2 | 11/2021 | Gist, IV |
| 11,681,298 B2 | 6/2023 | Gist, IV et al. |
| 2007/0219720 A1 | 9/2007 | Trepagnier et al. |
| 2010/0052945 A1 | 3/2010 | Breed |
| 2010/0180709 A1 | 7/2010 | Choi |
| 2012/0153087 A1 | 6/2012 | Collette et al. |
| 2013/0190982 A1 | 7/2013 | Nakano et al. |
| 2013/0218518 A1* | 8/2013 | Dimitri ................. G05B 15/02 702/152 |
| 2014/0324266 A1 | 10/2014 | Zhu et al. |
| 2014/0347440 A1 | 11/2014 | Hatcher |
| 2014/0350768 A1 | 11/2014 | Filippov et al. |
| 2015/0112550 A1 | 4/2015 | Cho et al. |
| 2016/0299228 A1 | 10/2016 | Maleki et al. |
| 2017/0016870 A1 | 1/2017 | McPeek |
| 2017/0076227 A1 | 3/2017 | Elgie et al. |
| 2017/0270361 A1 | 9/2017 | Puttagunta et al. |
| 2018/0031678 A1 | 2/2018 | Singer et al. |
| 2018/0053102 A1 | 2/2018 | Martinson et al. |
| 2018/0060725 A1 | 3/2018 | Groh et al. |
| 2018/0113210 A1 | 4/2018 | Izadian |
| 2018/0136644 A1 | 5/2018 | Levinson et al. |
| 2018/0188032 A1 | 7/2018 | Ramanandan et al. |
| 2018/0188037 A1 | 7/2018 | Wheeler et al. |
| 2018/0188736 A1 | 7/2018 | Jian et al. |
| 2018/0196127 A1 | 7/2018 | Harada |
| 2018/0307944 A1 | 10/2018 | Li et al. |
| 2019/0004525 A1 | 1/2019 | Bills et al. |
| 2019/0012907 A1 | 1/2019 | Itahara |
| 2019/0147610 A1 | 5/2019 | Frossard et al. |
| 2019/0164049 A1 | 5/2019 | Bai et al. |
| 2019/0180451 A1 | 6/2019 | Kellner |
| 2019/0258251 A1 | 8/2019 | Ditty et al. |
| 2019/0354782 A1 | 11/2019 | Kee et al. |
| 2020/0074862 A1 | 3/2020 | Johnston et al. |
| 2020/0118359 A1 | 4/2020 | Sato |
| 2020/0142408 A1 | 5/2020 | Valois et al. |
| 2020/0142409 A1 | 5/2020 | Valois et al. |
| 2020/0142422 A1 | 5/2020 | Valois et al. |
| 2020/0142426 A1 | 5/2020 | Gist, IV |
| 2020/0209867 A1 | 7/2020 | Valois et al. |
| 2020/0210777 A1 | 7/2020 | Valois et al. |
| 2020/0391736 A1 | 12/2020 | Smith et al. |
| 2022/0050471 A1 | 2/2022 | Gist, IV et al. |
| 2023/0350417 A1 | 11/2023 | Gist, IV et al. |

FOREIGN PATENT DOCUMENTS

| | | |
|---|---|---|
| EP | 3874294 | 9/2021 |
| KR | 20160000573 | 2/2016 |
| WO | 2014168851 | 10/2014 |
| WO | 2018102363 | 6/2018 |
| WO | 2020091832 | 5/2020 |

OTHER PUBLICATIONS

China National Intellectual Property Administration; Decision of Rejection issued for Application No. 201980071453.4, 11 pages, dated Jun. 21, 2023.
Canadian Intellectual Property Office, Examination with Search Report issued in App. No. 3,118,402, 3 pages, dated Jun. 20, 2022.
Japanese Patent Office, Decision of Grant issued in App. No. 2021-523509, 5 pages, dated Aug. 1, 2022.
Korean Intellectual Property Office, Notice of Grounds for Rejection issued in App. No. 10-2021-7012268, 11 pages, dated Jul. 18, 2022.
Chinese Patent Office, Second Office Action issued in App. No. 201980071453.4, 6 pages, dated Aug. 24, 2022.
Chinese Patent Office, First Office Action issued in Application No. 201980071453.4, 26 pages, dated Feb. 21, 2022.
Japanese Patent Office, Notice of Reasons for Rejection issued in Application No. 2021-523509, 6 pages, dated May 17, 2022.
United States Patent Office, Office Action in U.S. Appl. No. 16/271,355 dated Apr. 19, 2021.
United States Patent Office, Notice of Allowance in U.S. Appl. No. 16/271,355 dated Aug. 2, 2021.
360 Fly; The Cameras That Miss Nothing. and Change Everything. https://www.369fly.com/shop/cameras, dated Jun. 5, 2018.
Bojarski, et al.; End to End Learning for Self-Driving Cars, dated Apr. 25, 2016.
Google; Accessorize Your Camera—Google Street View, https://www.google.com/streetview/publish/mounts/, dated Jun. 5, 2018.
Google; Create Street View in a Snap—Google Street View, https://www.google.com/streetview/publish/, dated Jun. 5, 2018.
Insta360; Insta360 Pro, https://mall.insta360.com/product/pro, dated Jun. 5, 2018.
NC Tech; iSTAR Camera, Amazing Results with the iSTAR Panoramic Camera, https://www.nctechimaging.com/stall, dated Jun. 5, 2018.
NC Tech; The iSTAR Pulsar big data capture system, https://www.nctechimaging.com/istar-pulsar-techspec/, dated Jun. 5, 2018.
Matterport; Matterport Prot 3D Camera Specifications, https://supportmatterport.com/hc/en-us/articles/115004093167, dated Jun. 5, 2018.
Ricoh Company; Theta V, https://theta360.com/en/about/theta/v.html, dated Jun. 5, 2018.
amazon.com; RIDIC Accessories, Large Street View Ready Camera Mount: Camera & Photo; https://www.amazon.aom/dp/B075CYB215, dated Jun. 5, 2018.

(56) References Cited

OTHER PUBLICATIONS amazon.com; Delkin DDMNT-TRIPLE Fat Gecko Three-Arm Suction Mount (Black): Professional Video Tripods: 3amera & Photo, https://www.amazon.com/gp/product/B00A86MMY8, dated Jun. 5, 2018.
YI Technology; YI 360 VR Camera, https://www.yitechnology.com/yi-360-vr-camera-specs, dated Jun. 5, 2018.
International Searching Authority; Search Report and Written Opinion for PCT Application No. PCT/US2019/024947; 12 pages; dated Jun. 25, 2019.
Japanese Patent App. No. 2021-523509 entered national stage on Apr. 28, 2021.
Chinese Patent App. No. 201980071453.4 entered national stage on Apr. 28, 2021.
Korean Patent App. No. 10-2021-7012268 entered national stage on Apr. 23, 2021.
Canadian Patent App. No. 3,118,402 entered national stage on Apr. 30, 2021.
European Patent App. No. 19722303.5 entered national stage on May 27, 2021.
European Patent Office, International Preliminary Report on Patentability for PCT/US2019/024947 dated Apr. 27, 2021.
European Patent Office, Communication pursuant to Rules 161(1) and 162EPC for app. No. 19722303.5 dated Jun. 11, 2021.
Desjardins, C. et al.; Cooperative Adaptive Cruise Control: A Reinforcement Learning Approach; IEEEE, vol. 12, No. 4; pp. 1248-1260; dated Dec. 2011.
Ye, H. et al.: Machine LEarning for Vehicular Networks: Recent Advances and Application Examples; IEEE, vol. 13, No. 2; pp. 94-101; dated Jun. 1, 2018.
Dresner, et al.; A Multiagent Approach to Autonomous Intersection Management, Journal of Artificial Intelligence Research 31 (2008) 591-656, dated Mar. 2018.
Cortica Automotive; It's Not Enough to Recognize a Traffic Light 99% of the Time, http://www.cortica.com/automotive/index.html, dated Jun. 5, 2018.
Michels, Jeff, et al.; High Speed Obstacle Avoidance using Monocular Vision and Reinforcement Learning, Somputer Science Department, Stanford University, Proceedings of the 22nd International Conference on Machine _earning, Bonn, Germany, dated 2005.
Dresner, Kurt, et al.; Stone P. (2006) Multiagent Traffic Management: Opportunities for Multiagent Learning. In: Tuyls K., Hoen P.J., Verbeeck K., Sen S. (eds) Learning and Adaption in Multi-Agent Systems. LAMAS; Lecture Votes in Computer Science, vol. 3898. Springer, Berlin, Heidelberg, dated 2005.
Pongpunwattana, Anawat, et al.; Real-Time Planning for Multiple Autonomous Vehicles in Dynamic Jncertain Environments. Journal of Aerospace Computing Information and Communication—J Aerosp Comput Inf 7,0mmun. 1. 580-604. 10.2514/1.12919. 2004.
Roderick, Norman, et al.; Reinforcement Learning for Autonomous Vehicles; dated 2002.

* cited by examiner

REMOVABLE AUTOMOTIVE LIDAR DATA COLLECTION POD

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0. With Level 1 autonomy, a vehicle controls steering or speed (but not both), leaving the operator to perform most vehicle functions. With Level 2 autonomy, a vehicle is capable of controlling steering, speed, and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only under certain conditions such as only in certain types of roads (e.g., highways) or only in certain geographic areas (e.g., a geofenced metropolitan area which has been adequately mapped). Finally, Level 5 autonomy represents that a vehicle is capable of operating without operator input under all conditions.

A fundamental challenge to any autonomy-related technology relates to collecting and interpreting information about a vehicle's surrounding environment, along with planning and executing commands to appropriately control vehicle motion to safely navigate the vehicle through its current environment. Therefore, continuing efforts are being made to improve each of these aspects, and by doing so autonomous vehicles increasingly are able to safely and reliably operate in increasingly complex environments and accommodate both expected and unexpected interactions within an environment.

SUMMARY

Techniques are described herein that enable a method and apparatus that include a vehicle agnostic removable pod equipped with a sensor suite and a computing device for collecting and time stamping data about a vehicle's surrounding environment as well as data about the vehicle itself. The sensor suite of a removable pod (also referred to herein as a "pod") can collect a variety of environmental data utilizing a variety of sensors including an Inertial Measurement Unit ("IMU"), a three dimension ("3D") positioning sensor (e.g., a Global Positioning System ("GPS")), one or more cameras, a Light Detection and Ranging ("LIDAR") unit, etc. The removable pod can also connect to the vehicle for direct data collection from the car in additional to data collected by sensors integrated into the removable pod. For example, the removable pod can connect to a vehicle Controller Area Network ("CAN") bus, for example by connecting to a vehicle's on board diagnostics ("OBD") port (e.g., an OBDII port), to gain access to a variety of vehicle data such as vehicle speed data, braking data, steering control data, etc. Additionally or alternatively, the removable pod can be powered by the vehicle. For example, a removable pod can be powered by a DC connector in the vehicle (e.g., a 12 volt vehicle receptacle), a USB port in the vehicle, or various other electrical connections within the vehicle, such as a vehicle taillight, etc. In several implementations, mounting removable pods on a variety of vehicles can create a greater diversity of environmental data measurements compared to collecting environmental data using a single vehicle.

A computing device connected to the removable pod can record environmental data collected by the sensor suite as well as vehicle data from a CAN bus. In a variety of implementations, the computing device can time stamp the data as it is collected from the environment using the sensor suite integrated in the removable pod and/or directly as it is collected from the vehicle (e.g., collected vehicle data from the vehicle CAN bus). Additionally or alternatively, a sensor can provide its own time stamp (e.g., a LIDAR unit can generate its own time stamps for data it collects). In many implementations, the computing device can combine the environmental data, the vehicle data, as well as various predefined sets of data such as known information about a specific vehicle (e.g., known information about a vehicle's color, make, model, etc. can be supplied by a user when mounting the removable pod on a vehicle) with the corresponding time stamps to generate a single data structure. In some such implementations, these data structures can be uploaded to a remote server (i.e., upload the data to the cloud) for further remote processing. Processing of the data collected using the sensor suite of the removable pod (i.e., environmental data) and/or data collected directly from the vehicle (i.e., vehicle data) with corresponding time stamps can be performed in real time, near real time, and/or the data can be stored and processed at a later time. In some implementations, the data collected by the removable pod can be combined and processed with additional data collected from other sources, for example from one or more additional removable pods. In other words, data collected from two vehicles each mounted with a removable pod in a similar location at the same time can be combined into a single data set.

In many implementations, the removable pods can be vehicle agnostic. In other words, removable pods can be mounted on many (and for some removable pod configurations, any) vehicle type. For example, removable pods can be mounted on cars, trucks, motorcycles, sports utility vehicles, vans, mopeds, tractor trailers, busses, motorized scooters, etc. Additionally or alternatively, removable pods can be mounted on variations of vehicles within a vehicle type. For example, car manufactures make a wide variety of types of cars, and the removable pod can be mounted on many cars regardless of their make and model. By allowing the removable pod to be vehicle agnostic, a richer set of diverse data may be collected from various automobile perspectives. Several vehicle agnostic removable pods mounted on various vehicles can quickly collect a large amount of data. In other words, the data collection can scale very quickly by, for example, going to a new location and placing removable pods of a group of rented cars.

In some implementations, multiple removable pods can be mounted on a single vehicle. For example, two pods can be mounted on a car towing a trailer (i.e., one removable pod can be mounted on the car and a second removable pod can be mounted on the trailer). At times the car and the trailer will move in different directions (e.g., when the car is backing up, etc.) and data from both the car and the trailer can be useful for further analysis. In implementations, the pod attached to the car and the pod attached to the trailer can collect data simultaneously. Multiple pods attached to a single vehicle can connect to the same computing device to collect and store data. Additionally or alternatively, multiple pods attached to a single vehicle can each interface with their own computing device to collect data and the data from the multiple removable pods can be aggregated together once the computing devices uploads the various time stamped data to the cloud or other storage media.

To analyze sensor data collected from the removable pods, it can be important to know the position of the removable pod on the vehicle. In many implementations, mounting a pod includes determining the position of the pod and/or determining if the pod is in a valid position. A valid position as used herein means the removable pod has been mounted on a vehicle such that sensors in the removable pod are aligned in a position where the sensors can collect data from a known predefined perspective. In some implementations, a user interface on the computing device can guide a user through positioning the removable pod on the vehicle. For example, if the desired location of the pod is the center of the roof of a car, a user interface can guide a user in finding the center of the roof. In many implementations, the sensor suite within the removable pod can capture data while a user is positioning the pod. For example, one or more sensors within the removable pod can take measurements of the vehicle. In a variety of implementations, a user can provide identifying information about the vehicle (e.g., a make, model, year, etc. of a car) and measurements of the vehicle can be determined from a database either stored locally on the computing device and/or accessed on a remote server in order to properly identify the optimum predefined position for data collection of that particular vehicle. Additionally or alternatively, vehicle measurements can be determined from both user provided identifying information and measurements of a vehicle taken using one or more sensors in a pod. Moreover, once a user has mounted the removable pod, the sensor suite can capture additional data to confirm the valid placement of the pod for the user.

A removable pod can be attached to a vehicle using one or more adjustable pod mounts (e.g., a tripod style three pod mount configuration) that allows the sensor suite in the removable pod to be aligned to the valid position regardless of the shape of the vehicle. In other words, one or more legs of the pod mount can be adjusted such that the sensors in the pod are positioned to collect data for variably shaped vehicles. For example, the roof of vehicle A can have a different curvature compared to the roof of vehicle B. The adjustable mount can align the removable pod on both vehicle A and vehicle B by adjusting one or more legs of the tripod mount to account for the curvature of the particular vehicle roof. Legs of the tripod mount can attach to a vehicle in a variety of ways including suction cups, magnets, etc. In some implementations, the pod can be centered on the top of a vehicle (e.g., centered on the roof of a car, centered on the roof of a truck, etc.). In other implementations, the pod can be attached to the front of a vehicle (e.g., positioned on the front of the roof of a car, positioned on the front of a motorcycle, etc.). In some implementations, the pod can be attached to a vehicle in a position to increase the field of view of the pod sensors. In other words, the position of the pod can reduce one or more portions of the vehicle that obstruct the field of view of the sensors, such as positioning the removable pod at the highest point on a vehicle to increase the field of view of the environment for LIDAR unit data collection.

Removable pods can be mounted in some implementations on autonomous vehicles to supplement the sensors available to the autonomous vehicle. In such implementations, a removable pod may not contain the full variety and/or number of sensors found in an autonomous vehicle. Additionally or alternatively, removable pods can be mounted on non-autonomous vehicles. In some implementations, removable pods mounted on non-autonomous vehicles can collect data which can be processed remotely and used in training the control systems of autonomous vehicles. In some implementations several non-autonomous vehicles having a mounted removable pod and/or several autonomous vehicles can drive in the same area to simultaneously collect data. Furthermore, in implementations, a variety of multiple non-autonomous vehicles can be used simultaneously to increase the diversity of the data collected. For example, the removable pods can be mounted on several different makes, models, and types of vehicles.

Data collection by a removable pod on a vehicle moving throughout a mapping area concurrently traversed by autonomous vehicles may be beneficial to supplement existing mapping data. For example, data collected from a pod on a vehicle at a known location and time may be used in automatic labeling of data collected from an autonomous vehicle. For example, in some implementations, the removable pod may collect environmental data through a suite of sensors in the vehicle including data available in the CAN. Once this data collected using a removable pod from a non-autonomous vehicle (i.e., non-AV data) is correlated in time and place with the autonomous vehicle, systems may be utilized to automatically label autonomous vehicle collected data related to the non-autonomous vehicle. Such data collection and labeling may extend as well to sensor data obtained by and external to the non-autonomous vehicle. For example, labeled data can be utilized to aid in labeling objects in the environment that are visible to the non-autonomous vehicle removable pod sensor suite but are occluded from the view of the autonomous vehicle sensor suite. In other words, the field of view of the autonomous vehicle can be extended by mapping labeled data collected by a removable pod mounted on a non-autonomous vehicle to a temporally and/or physically located autonomous vehicle.

Data collection by a removable hardware pod as disclosed herein can quickly generate large amounts of data. Furthermore, by mounting removable hardware pods on varying types of vehicles, varying removable pod positions, varying pod hardware, etc., a greater diversity of data can be collected. This collected data can be used in training a machine learning model, and the large diversity of data can reduce overfitting the machine learning model to the training data. Additionally or alternatively, removable hardware pods can reduce the cost associated with data collection by allowing virtually any vehicle to be used in data collection without specific customization of the vehicle being necessary.

The above description is provided as an overview of various implementations disclosed herein. Those various implementations, as well as additional implementations, are described in more detail herein.

In some implementations, a method of scalable vehicle data collection is provided that includes receiving environmental data from a plurality of sensors of a removable pod attached to a vehicle in an environment using a pod mount, where the plurality of sensors includes at least an inertial measurement unit (IMU), a three dimension (3D) positioning sensor, a camera, and a Light Detection and Ranging (LIDAR) unit. The method further includes receiving vehicle data from a Controller Area Network (CAN) bus, where the removable pod is connected to the CAN bus. The method further includes recording, using a computing device connected to the removable pod, the combined environmental data and the vehicle data. The method further includes determining, using the computing device, time stamps for each instance of the environmental data and time stamps for each instance of the vehicle data recorded by the computing device. The method further includes transmitting, using the computing device, an aggregation of the time stamped instances of environmental data and the time stamped instances of vehicle data to a remote server.

These and other implementations of the technology disclosed herein can include one or more of the following features.

In some implementations, the pod mount is a tripod mount with three legs, where a height one or more of the three legs is adjustable. In some versions of those implementations, each of the three legs attach to the vehicle using a suction cup.

In some implementations, the method further includes calibrating a position of the pod on the vehicle using a user interface of the computing device. In some versions of those implementations, calibrating the position of the removable pod on the vehicle comprises measuring a set of vehicle dimensions using the plurality of sensors. In some versions of those implementations, calibrating the position of the removable pod on the vehicle comprises identifying the vehicle using the user interface of the computing device to obtain a known set of vehicle dimension measurements of the vehicle. In some versions of those implementations, calibrating the position of the pod on the vehicle comprises confirming the position of the removable pod by receiving positioning environmental data from the plurality of sensors.

In some implementations, the vehicle is a non-autonomous vehicle. In some versions of those implementations, the non-autonomous vehicle is collecting data in the same area with an autonomous vehicle.

In some implementations, a plurality of removable pods are attached to a plurality of non-autonomous vehicles, and the plurality of removable pods receive environmental data in the same environment.

In some implementations, transmitting the time stamped instances of environmental data and the time stamped instances to the remote server of vehicle data for plurality of removable pods attached to the plurality of non-autonomous vehicles further includes storing the time stamped instances of environmental data and time stamped instances of vehicle data for the plurality of removable pods on the remote server. In some versions of those implementations, the method further includes determining an aggregation of the stored time stamped instances of environmental data and the time stamped instances of vehicle data for each removable pod in the plurality of removable pods. In some versions of those implementations, determining an aggregation of the stored time stamped instances of environmental data and the time stamped instances of vehicle data for each removable pod further includes determining an aggregation of the stored time stamped instances of environmental data and the time stamped instances of vehicle data for each removable pod in the plurality of removable pods with an external data source.

In some implementations, the vehicle is selected from a group consisting of a car, a truck, a motorcycle, a moped, a tractor trailer, and a bus.

In some implementations, the computing device is selected from a group consisting of a laptop computer, a tablet computer, and a cellular telephone.

In some implementations, the removable pod is powered by a power source in the vehicle selected from a group consisting of a DC power source and a USB port.

In some implementations, the 3D positioning sensor is selected from a group consisting of Global Positioning System, Global Navigation Satellite System, BeiDou Navigation Satellite System, and Galileo.

In some implementations, receiving vehicle data from a CAN bus includes the CAN bus interfacing with an On Board Diagnostic II (OBDII) port in the vehicle.

In addition, some implementations include one or more processors (e.g., central processing unit(s) ("CPU"(s)), graphics processing unit(s) ("GPU"(s)), and/or tensor processing unit(s) ("TPU"(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
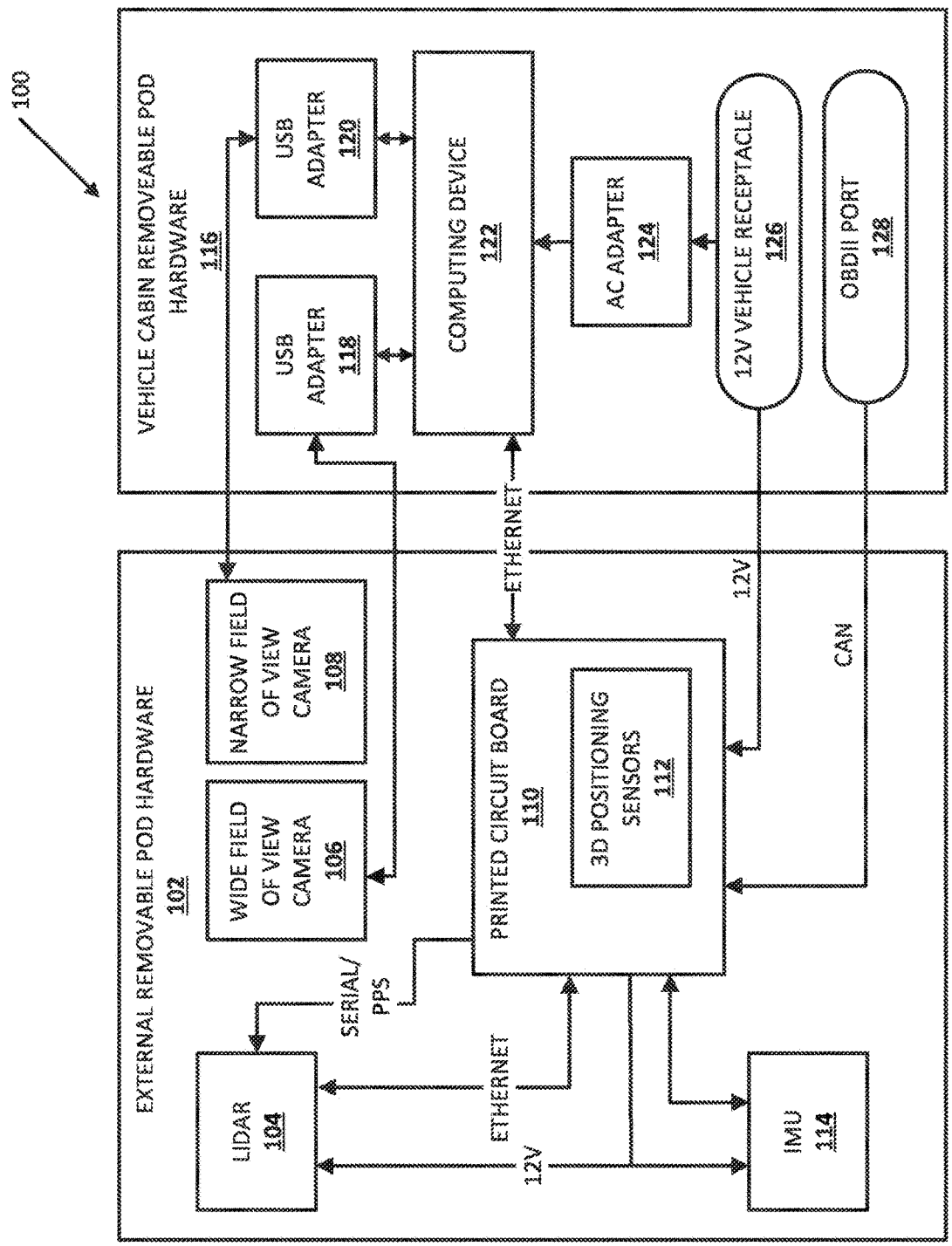
FIG. 1 is a block diagram of an example environment in which implementations disclosed herein may be implemented.
Figure 2:
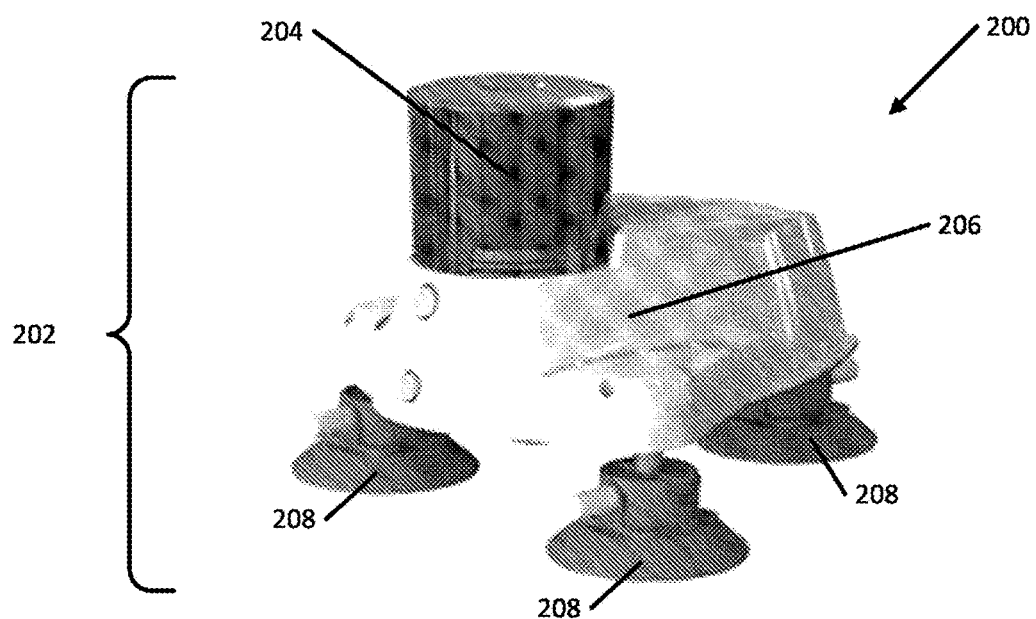
FIG. 2 is an image illustrating an example of a removable pod according to implementations disclosed herein.

Referring to FIG. 1, a block diagram of an example environment is illustrated in which implements disclosed herein may be implemented. Example environment 100 in FIG. 1 includes external removable pod hardware 102 and vehicle cabin removable pod hardware 116. External removable pod hardware 102 can include a variety of sensors to collect environmental data. In a variety of implementations, a pod sensor suite can include LIDAR unit 104, wide field of view camera 106, narrow field of view camera 108, 3D positioning sensors 112 such one or more Global Navigation Satellite Systems including: GPS, Global Navigation Satellite System ("GLONASS"), BeiDou Navigation Satellite System ("BDS"), Galileo, etc., IMU 114, etc. In a variety of implementations, printed circuit board ("PCB") 110 can be utilized to provide connections between various sensors within the sensor suite of external removable pod hardware 102. In a variety of implementations, one or more components of external removable pod hardware 102 can be contained in hardware housing 206 as illustrated in FIG. 2.

Vehicle cabin removable pod hardware 116 can be separate from the mountable pod hardware. In some implementations, vehicle cabin removable pod hardware 116 can include USB adapters 118, 120, computing device 122, AC adapter 124, 12V vehicle receptacle 126, OBDII port 128, etc. Computing device 122 can include a variety of devices including a laptop computing device, a tablet computing device, a cellular telephone computing device, etc.

The vehicle itself can power external removable pod hardware 102 and/or computing device 122. In some such implementations, 12V vehicle receptacle 126 can connect to PCB 110 to provide power to external removable pod hardware 102. Additionally or alternatively, 12V vehicle receptacle 126 can provide power to AC adapter 124. In some such implementations, AC adapter 124 can provide power to computing device 122. Additionally or alternatively, computing device 122 can include one or more USB ports, each of which can connect to one or more USB adapters such as USB adapter 118, 120.

Environmental data collected by one or more cameras 106/108 for example, can be transmitted via a USB adapter to computing device 122. Additionally or alternatively, one or more cameras can receive power using a USB adapter. Furthermore, computing device 122 can transmit one or more control signals to one or more cameras utilizing connections made by USB adapters. For example, wide field of view camera 106 can transmit environmental data to computing device 122, receive command signals from computing device 122, and/or be powered utilizing USB adapter 118. Similarly, narrow field of view camera 108 can transmit environmental data to computing device 122, receive command signals from computing device 122, and/or be powered utilizing USB adapter 120. In some implementations, multiple cameras can connect to computing device 112 via a single USB adapter. Additionally or alternatively, in many implementations any of a variety of cameras can be used including the aforementioned wide field of view camera 106 and narrow field of view camera 108 as well as a light field camera, a thermal imaging camera, etc. In many implementations, one or more cameras can connect directly to PCB 110 (not illustrated).

Computing device 122 can connect to PCB 110 in external removable pod hardware 102 via an Ethernet connection. In many implementations, an Ethernet connection can be a wired connection. Additionally or alternatively, an Ethernet connection can be a wireless connection. Computing device 122 can transmit information to PCB 110 as well as receive environmental data collected by a variety of sensors in the external removable hardware pod 102 via the Ethernet connection. In some implementations, 3D positioning sensors 112 can be integrated directly into PCB 110. In other implementations, 3D positioning sensors 112 can be separate and connect with PCB 110 (not illustrated).

PCB 110 can provide power (for example 12V) to a variety of sensors including 3D positioning sensors 112, LIDAR unit 104, IMU 114, wide field of view camera 106 (not illustrated), narrow field of view camera 108 (not illustrated), etc. In many implementations, PCB 110 can synchronize timing with LIDAR unit 104 via a serial pulse per second ("PPS") connection, an Ethernet connection, and/or additional connections. Additionally or alternatively, PCB 110 and LIDAR unit 104 can transmit and receive data via an Ethernet connection. For example, environmental data collected by LIDAR unit 104 can be transmitted to PCB 110 via an Ethernet connection. In various implementations, PCB 110 can transmit and receive information with IMU 114. In many implementations, PCB 110 can interface with vehicle data ports, such as OBDII port 128, to additionally collect a variety of corresponding vehicle data. Additionally or alternatively, computing device 122 can interface with a vehicle data port including OBDII port 128 to collect a variety of additional vehicle data (not pictured) such as information collected from the additional vehicle's CAN bus. Additional vehicle data in accordance with many implementations can include: vehicle speed data, braking data, steering control data, etc.

In a variety of implementations, environmental data and/or vehicle data can be appended with a time stamp by PCB 110, computing device 122, and/or individual sensors (e.g., LIDAR units can generate their own time stamps). Additionally or alternatively, time stamped environmental and/or time stamped vehicle data can be combined and uploaded to the cloud using computing device 122 in conjunction with known communication pathways and hardware. In some such implementations, the removable pod can combine time stamped environmental and time stamped vehicle data by creating an instance of data at each time step (i.e., each instance of data can include environmental data at a specific time stamp (if any) as well as vehicle data at the same specific time stamp (if any)).

FIG. 2 illustrates an image 200 of a removable pod in accordance with implementations disclosed herein. Removable pod 202 can include a variety of elements such as one or more sensors 204, hardware housing 206, removable pod mount(s) 208, etc. One or more sensors 204 which can be utilized in removable pod 202 are illustrated in FIG. 1.

In a variety of implementations, a LIDAR unit can be the highest point on a removable pod 202. Hardware housing 206 can protect various portions of removable pod 202 from weather elements such as rain, snow, wind, hot temperatures, cold temperatures, etc. A variety of shapes of hardware housing can be utilized in removable pod 202 in addition or alternatively to hardware housing 206 as illustrated in FIG. 2. For example, hardware housing 206 can include two or more housing units to house separate portions of the removable pod 202 as well as a different shaped hardware housing 206.

In a variety of implementations, removable pod mount(s) 208 can attach removable pod 202 to a vehicle. Removable pod mount(s) 208 can be adjusted such that sensors within a removable pod 202 can collect data from a preferred defined position and/or location. For example, removable pod mount(s) 208 can be adjusted to compensate for different curvatures between different vehicles. Removable pod mount(s) 208 can attach removable pod 202 to a vehicle in a variety of ways including: suction cups, magnets, adhesives (e.g., glue, tape), etc. In some implementations, removable pod mount(s) 208 can be a single mount. Varying number of mounts can be included in removable pod 202 in accordance with various implementations. For example, removable pod 202 can include two removable pod mounts 208, three removable pod mounts 208, four removable pod mounts 208, etc. In many implementations, three removable pod mounts 208 can be arranged in a tripod style configuration.

Figure 3:
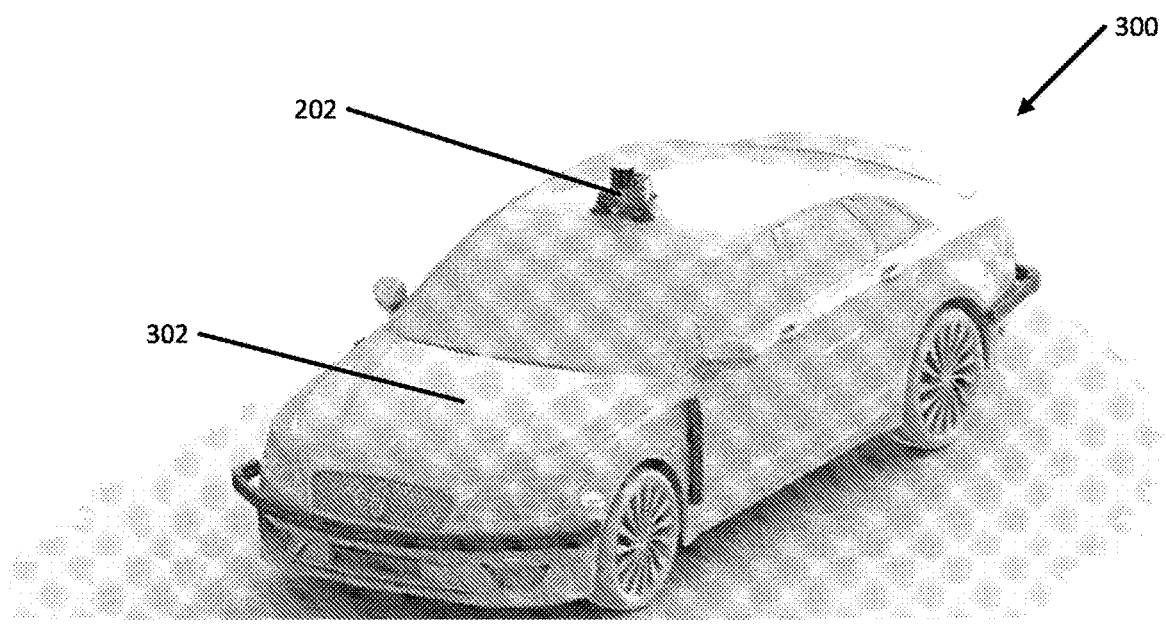
FIG. 3 is an image illustrating an example of a removable pod mounted on a vehicle according to implementations disclosed herein.

FIG. 3 illustrates an image of a removable pod mounted on a vehicle in accordance with implementations disclosed herein. Combined automobile and pod 300 includes removable pod 202 mounted atop a vehicle 302 in a predefined preferred position. In a variety of implementations, removable pod 202 is vehicle agnostic and can be mounted on a variety of vehicles 302 including: cars, trucks, motorcycles, sports utility vehicles, vans, mopeds, tractor trailers, busses, motorized scooters, etc. In some implementations, components linked with removable pod 202 can be inside vehicle 302. For example, vehicle cabin removable pod hardware 116 (as illustrated in FIG. 1) can be inside the vehicle. As a further example, vehicle cabin removable pod hardware 116 can be inside a car, sports utility vehicle, truck, bus, etc. In some such examples, a laptop computer can be utilized as computing device 122 in removable pod hardware 116, and the laptop computer can be stored inside the vehicle. In other implementations, a vehicle can lack an enclosed interior and vehicle cabin removable pod hardware can be stored "in" the vehicle in additional ways. For example, a motorcycle can utilize a cellular telephone computing device as computing device 122 in removable pod hardware 116. In some such examples, the motorcycle rider can carry the cellular telephone in a pocket. In implementations, the vehicle cabin removable pod hardware 116 can be combined with the external removable pod hardware. Alternatively, various portions of the external removable pod hardware 102 can be combine with selected portions of the vehicle cabin removable pod hardware 116.

In many implementations, several removable pods 202 can be mounted to vehicle 302 to increase the density of data collection. For example, a car can have a removable pod 202 mounted to its front right side and an additional removable pod 202 can be mounted to its front left side. As another example, a vehicle pulling a trailer can have a removable pod 202 mounted to the vehicle and a second removable pod 202 mounted to the trailer to capture, for example, additional data when the trailer moves in a different direction from the vehicle. As a further example, a bus can have three removable pods 202 mounted along the top to capture additional environmental data a single removable pod 202 could potentially miss because of the larger size of a bus when compared to a smaller vehicle such as a car. For example, line of sight perspectives of a pod on a larger vehicle could be restricted or even blocked due to the irregular shape of the vehicle, position of the pod or other reasons. Multiple pods on a vehicle may provide the ability to collect data from different perspectives, positions or obtain line of sight data not previously recordable. In some implementations, the removable pod is not connected to the vehicle control system of the vehicle to which the pod is mounted upon. In other words, the removable pod collects data and does not generate and/or send signals to control the vehicle.

Figure 4:
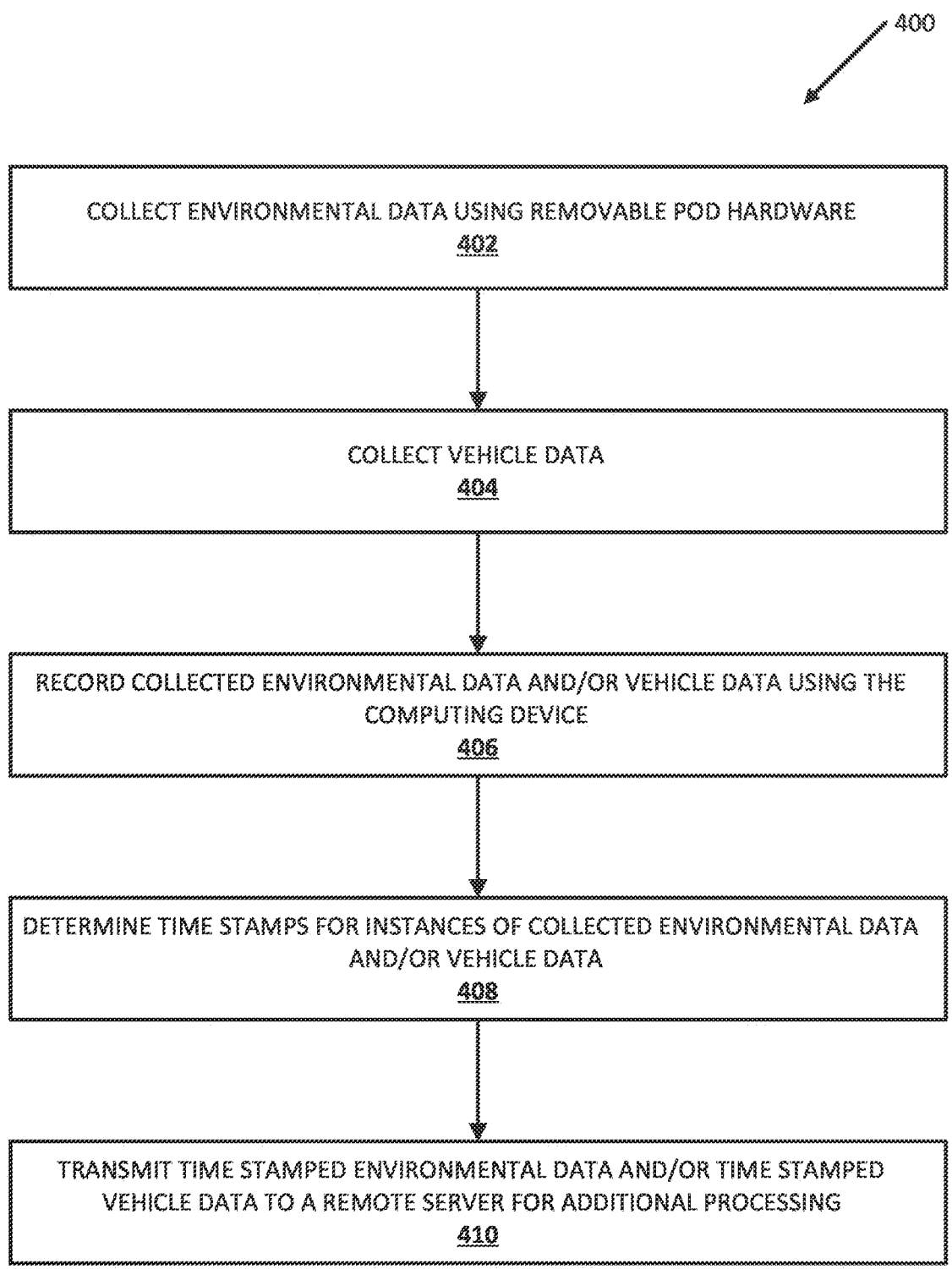
FIG. 4 is a flowchart illustrating an example process in accordance with implementations disclosed herein.

Referring to FIG. 4, an example process 400 for practicing selected aspects of the present disclosure, in accordance with various implementations is disclosed. For convenience, the operations of the flowchart are described with reference to a system that performs the operations. This system may include various components of various computer devices, including those described in FIG. 1 and/or FIG. 8. Moreover, while operations of process 400 are shown in a particular order, this is not meant to be limiting. One or more operations, elements, and/or steps may be reordered, omitted, and/or added.

At block 402, the system collects environmental data using removable pod hardware. In many implementations, environmental data includes a variety of information collected about a vehicle's surrounding environment. Environmental data can be collected by one or more sensors in the removable pod including an IMU, a 3D positioning sensor (such as GPS), one or more cameras, a LIDAR unit, etc. In many implementations, environmental data can be collected by one or more additional sensors included within the vehicle. For example, environmental data can include information collected by a rear backup camera in a vehicle.

At block 404, the system may also collect various additional vehicle data. In many implementations, vehicle data can be collected by one or more processors within the removable pod via a CAN bus which can, for example, be connected to an OBDII port in a vehicle. In various implementations, vehicle data can include information relating to the control of a vehicle including vehicle speed data, vehicle braking data, vehicle steering control data, etc.

At block 406, the system records collected environmental data and/or collected vehicle data can be recorded using the computing device. In a variety of implementations, the computing device, such as computing device 112 (as illustrated in FIG. 2) can be stored inside a vehicle. For example, a laptop computer can be utilized as the computing device and in some implementations can be stored inside a car. Alternatively or in addition thereto, recordation of the data may occur on a separate storage device operatively connected to the hardware 116, incorporated with hardware 116, or transmitted for recording remotely. At block 408, the system determines time stamps for instances of collected environmental and/or vehicle data. In many implementations, a time stamp can be associated with data using the computing device. In other implementations, sensors (e.g., LIDAR units) can provide their own time stamp which can be synched with computing device time stamps (if necessary). Additionally or alternatively, a PCB within removable pod hardware (such as PCB 110 as illustrated in FIG. 1) can be time synched with the computing device (such as computing device 122 as illustrated in FIG. 1). The PCB can provide time stamps for data collected by one or more sensors in the removable pod, and transmit environmental data with an associated time stamp to the computing device.

At block 410, the system transmits time stamped environmental data and/or time stamped vehicle data to a remote server for additional processing. In many implementations, additional processing can combine time stamped environmental and/or time stamped vehicle data from several removable pods. Additionally or alternatively, time stamped environmental data and/or time stamped vehicle data can be utilized to generate training data for a machine learning model such as a machine learning model utilized to generate control signals for an autonomous vehicle. In other implementations, additional processing can occur on the computing device (such as computing device 122 as illustrated in FIG. 1) prior to transmitting data to a remote server. Additional processing can occur in real time, near real time, and/or data can be stored and processed at later time.

Figure 5:
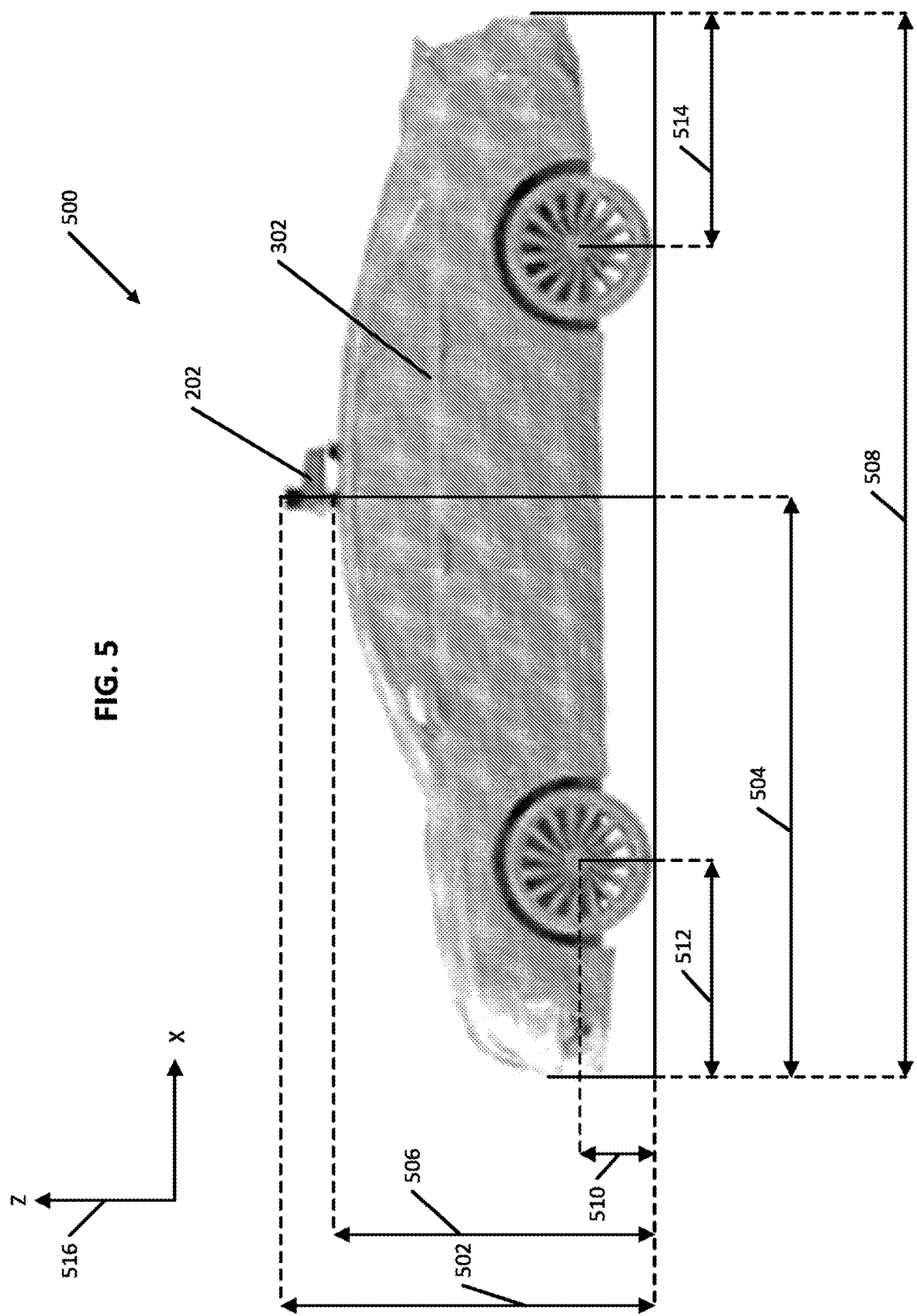
FIG. 5 is an image illustrating example measurements of a removable pod mounted on a vehicle in accordance with implementations disclosed herein.
Figure 6:
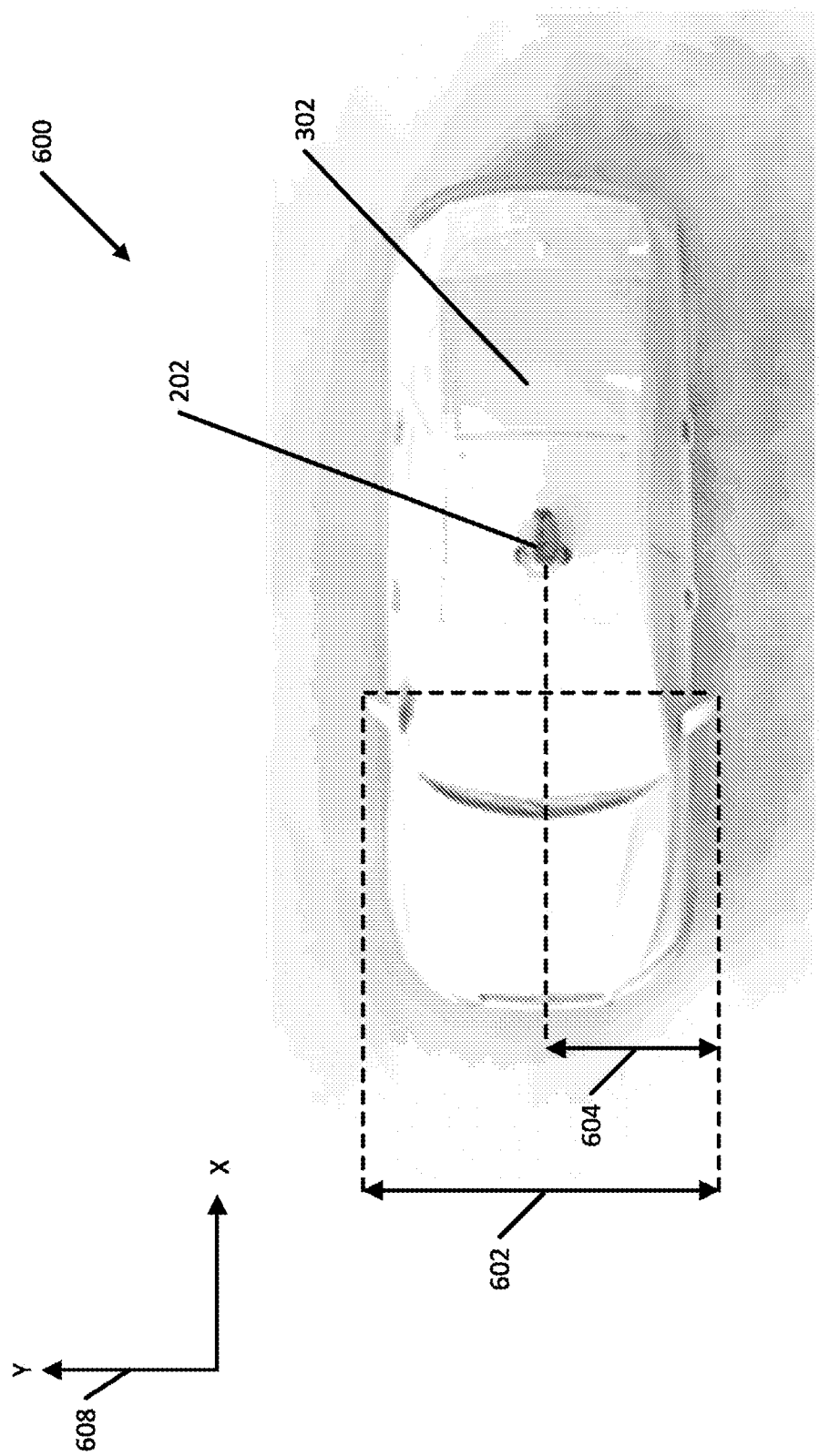
FIG. 6 is an image illustrating another example measurements of a removable pod mounted on a vehicle in accordance with implementations disclosed herein.

FIG. 5 illustrates an example combined vehicle and pod 500 of measurements of a removable pod mounted on a vehicle in accordance with implementations disclosed herein. FIG. 6 illustrates another example combined vehicle and pod 600 of measurements of a removable pod mounted on a vehicle. Images 500 and 600 include removable pod 202 and vehicle 302 similar to a removable pod and vehicle described in one or more of FIGS. 1-3. Image 500 includes a view of a removable pod mounted to a vehicle with respect to an X axis and a Z axis 516 where the X axis is in a direction substantially perpendicular to the Z axis. Image 600 illustrates a view of a removable pod mounted to a vehicle with respect to an X axis and a Y axis 608 where the X axis is substantially perpendicular to the Y axis. In many implementations, positions of a removable pod mounted on a vehicle as well as dimensions of a vehicle can be determined by measurements in an X axis, a Y axis, and a Z axis.

In many implementations, vehicle measurements can be utilized to determine the position of a removable pod mounted on a vehicle, and for example, if a pod is mounted in a correct position. In many implementations, a removable pod can be mounted in many positions. For example, a removable pod can be placed in many locations on the top of a car including the front center, the front left, the front right, the center of the middle of the car, etc.

In many implementations, a variety of measurements can be taken of the position of removable pod 202 mounted on vehicle 302 as well as measurements of the dimensions of vehicle 302. In various implementations, one or more sensors in a mounted removable pod can determine various measurements. Additionally or alternatively, vehicle measurements can be determined from a database of known vehicle information by a user providing the removable pod with identifying vehicle information (i.e., vehicle make, vehicle model, vehicle year, etc.). Furthermore, a human can manually take measurements of a vehicle and/or removable pod mounted on a vehicle. In many implementations, vehicle and/or removable pod measurements can be determined by a combination of measurements from one or more sensors in a removable pod, known vehicle measurements of various vehicles from a database, and/or manual measurements by a user.

In various implementations, the position of a mounted removable pod can be determined in three dimensions by measuring pod height 502 (Z axis), pod position X 504 (X axis) and pod position Y 604 (Y axis) as illustrated in FIGS. 5 and 6. Additionally or alternatively, vehicle measurements can be determined in three dimensions by measuring vehicle height 506 (Z axis), vehicle length 508 (X axis), and vehicle width 602 (Y axis). In many implementations, the front wheel position can be determined by measuring axel height 510 (Z axis) and front axle overhang 512 (X axis). Similarly, rear wheel position can be determined by measuring axel height 510 (Z axis) and rear axle overhang 514 (Y axis).

In a variety of implementations, different types of vehicles can be measured by a variety of sets of measurements. For example, the set of measurements for a truck can be different from the set of measurements for a motorized scooter. Additionally or alternatively, a variety of measurements can be taken when multiple removable pods are mounted on the same vehicle.

Figure 7:
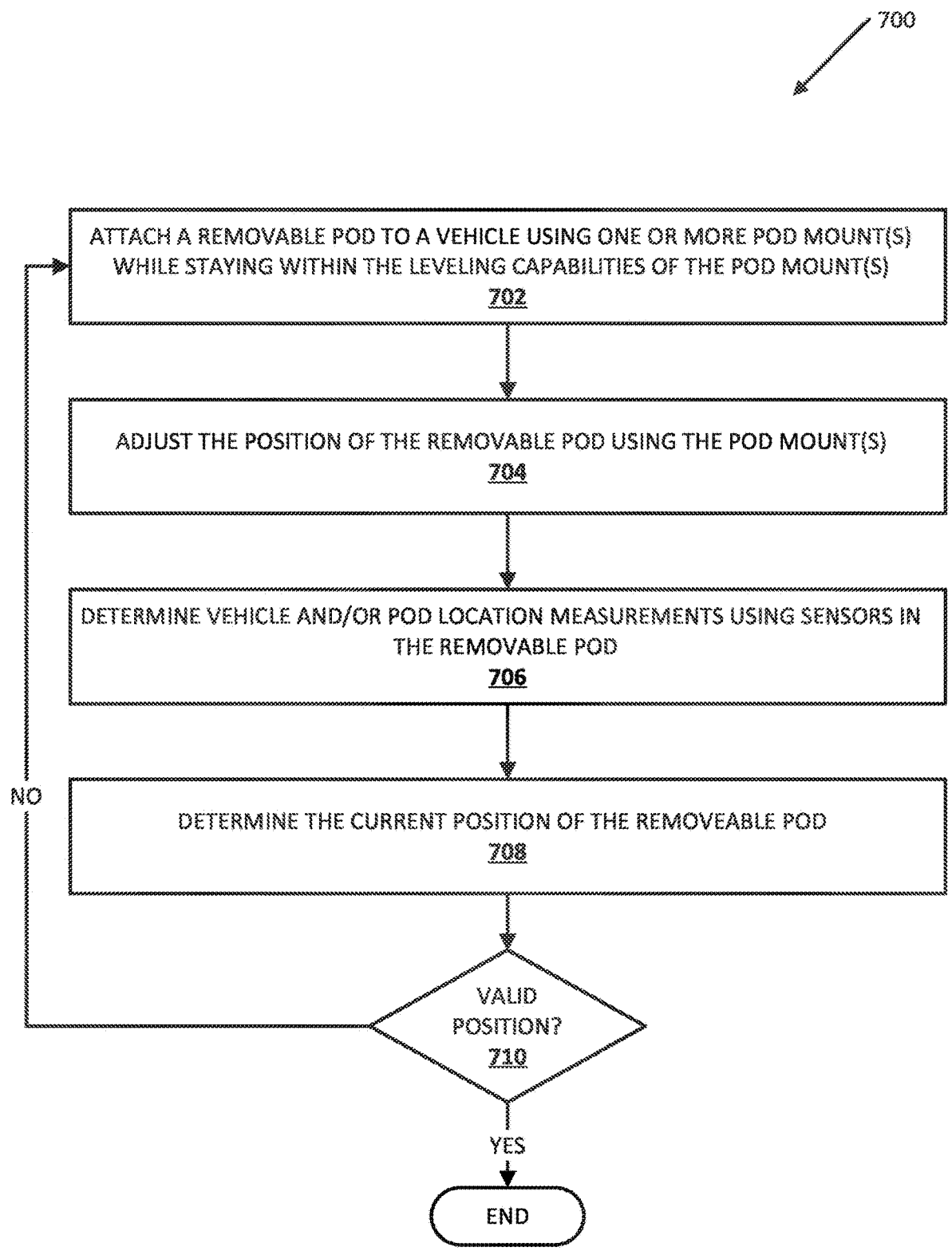
FIG. 7 is flowchart illustrating another example process in accordance with implementations disclosed herein.

Referring to FIG. 7, an example process 700 can position a removable pod on a vehicle in accordance with various implementations is disclosed. For convenience, the operations of the flowchart are described with reference to a system that performs the operations. This system may include various components of various computer systems, including those described in FIG. 1 and/or FIG. 8. Moreover, while operations of process 700 are shown in a particular order, this is not meant to be limiting. One or more operations, elements, and/or steps may be reordered, omitted, and/or added.

At block 702, the system attaches a removable pod to a vehicle using one or more pod mount(s) similar to pod mount 208 illustrated in FIG. 2. In many implementations, the position of the removable pod is within the leveling capabilities of the pod mount(s). In other words, a removable pod can be mounted on a surface that is not flat (e.g., the curved hood of a car) such that adjustable pod mount(s) can position sensors within the removable pod in a valid location. In many implementations, removable pod mount(s) can attach a removable pod to a vehicle utilizing suction cups, magnets, adhesives, etc. Additionally or alternatively, a removable pod can be positioned as close to the front of a vehicle that is within the leveling capabilities of the pod mount(s). In other implementations, a removable pod can be placed in any position where pod mount(s) can position the sensor suite of the removable pod in a position to collect data.

At block 704, the system adjusts the position of the removable pod using the pod mount(s). In a variety of implementations, the height of leg(s) of pod mount(s) can be adjusted such that the sensor suite in the removable pod can collect data. Adjusting the height of a leg of a pod mount can increase or decrease the height of a pod mount. Additionally or alternatively, the height of individual legs of pod mounts can each be adjusted independently for a removable pods with multiple pod mounts.

At block 706, the system determines vehicle measurements and/or pod location measurements using one or more sensors in the removable pod. For example, 3D positioning sensors (such as GPS), cameras, etc., can gather vehicle dimension measurements and/or removable pod location measurements.

At block 708, the system determines the current position of the removable pod. As described with respect to FIGS. 5 and 6, the position of a removable pod can be determined using a variety of measurements. In many implementations, a removable pod can utilize 3D positioning sensors (such as GPS), cameras, etc. and known information about vehicle measurements (e.g., manually measured vehicle measurements, vehicle measurements from known information about the specific vehicle, vehicle measurements taken using one or more sensors of the removable pod, etc.) to determine the positioning of a removable pod mounted on a vehicle. In a variety of implementations, the determined position of the removable pod can vary from the actual position of the removable pod. For example, a determined position of a mounted removable pod can vary by 10 cm in any direction and still provide accurate information. Additionally or alternatively, the determined position of a removable pod and the actual position of a removable pod can vary by additional increments such as twenty cm, fifteen cm, five cm, one cm, etc. in accordance with various implementations.

At block 710, the system determines if the removable pod is positioned in a valid location. As described herein, a removable pod can have multiple valid positions on a vehicle. If the system determines the removable pod is in a valid position, process 700 ends. Additionally or alternatively, if the removable pod is not in a valid position, the removable pod can be reattached in accordance with block 702 to the vehicle using one or more pod mount(s) and blocks 704, 706, 708, 710 can repeat until the removable pod is mounted in a valid position.

Figure 8:
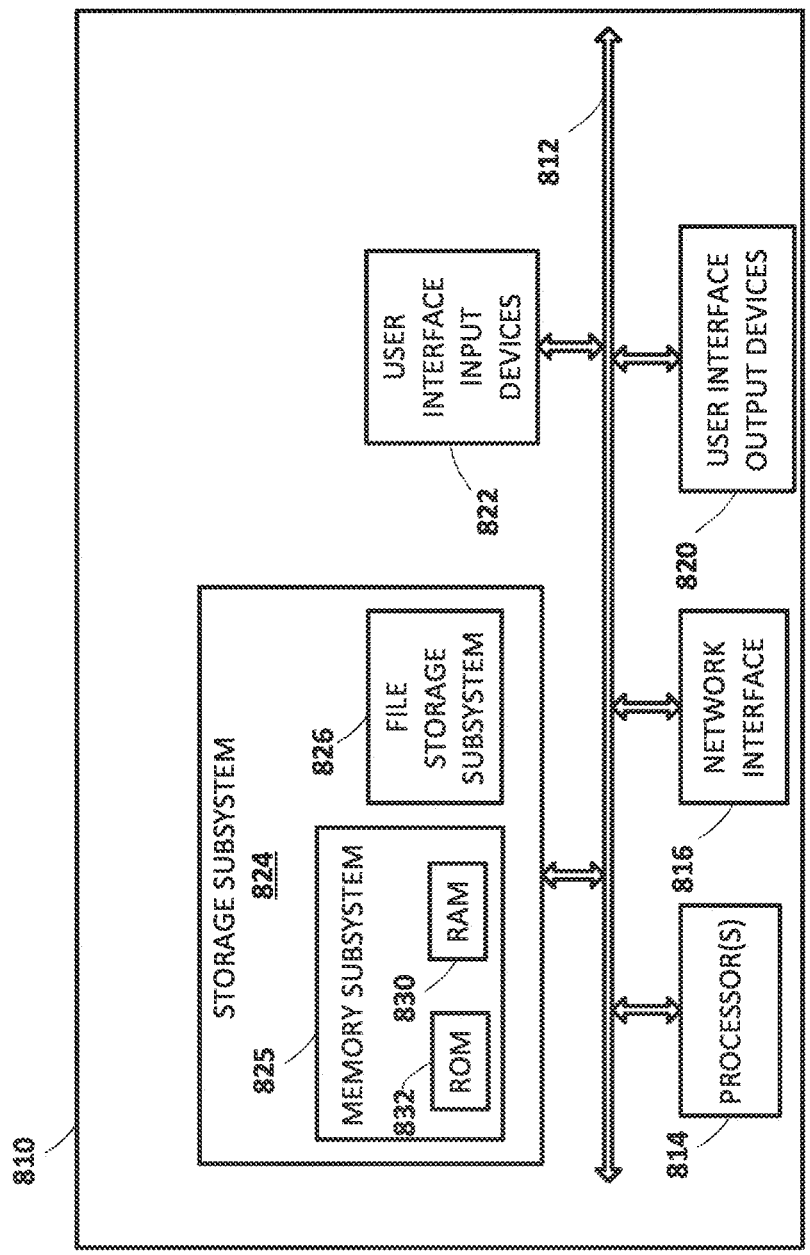
FIG. 8 illustrates an example architecture of a computing device.

FIG. 8 is a block diagram of an example computing device 810 that may optionally be utilized to perform one or more aspects of techniques described herein. In some implementations, one or more of external removable pod hardware 102, vehicle cabin removable pod hardware 116 and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816.

The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more of the processes of FIG. 4 and FIG. 7, as well as to implement various components depicted in FIG. 1.

These software modules are generally executed by processor 814 alone or in combination with other processors. Memory 825 used in the storage subsystem 824 can include a number of memories including a main random access memory ("RAM") 830 for storage of instructions and data during program execution and a read only memory ("ROM") 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed:

1. A method of collecting diverse driving data, the method comprising:
   for each of a plurality of removable pods each respectively attached to a unique vehicle in an environment:
   collecting respective environmental data of the environment using one or more sensors of a respective removable pod,
   recording the respective environmental data collected using the respective removable pod and corresponding vehicle data that corresponds to the respective environmental data,
   determining time stamps for each instance of the respective environmental data and time stamps for each instance of the corresponding vehicle data using a respective computing device connected to the respective removable pod,
   generating a respective aggregation of the time stamped instances of the respective environmental data and the time stamped instances of the corresponding vehicle data using the respective computing device, and
   transmitting, to a remote server, the respective aggregation of the time stamped instances of the respective environmental data and the time stamped instances of the corresponding vehicle data;
   aggregating, at the remote server, the time stamped instances of vehicle data and environmental data from the plurality of removable pods,
   wherein each of the unique vehicles is attached to at least one removable pod;
   generating training data for a machine learning model based on the time stamped instances of vehicle data and environmental data from the plurality of removable pods; and
   training, based on the training data, the machine learning model, to generate control signals for an autonomous vehicle.

2. The method of claim 1, wherein recording the respective environmental data and the corresponding vehicle data for the respective removable pod is performed using the respective computing device that is connected to the respective removable pod.

3. The method of claim 1, wherein recording the respective environmental data and the corresponding vehicle data for the respective removable pod occurs on a separate storage device operatively connected to a vehicle cabin removable pod hardware of the respective removable pod.

4. The method of claim 1, wherein the unique vehicles each being a non-autonomous vehicle that are collecting data in the environment with the autonomous vehicle or an additional autonomous vehicle.

5. The method of claim 4, further comprising:
automatically labeling data collected from the autonomous vehicle or the additional autonomous vehicle using data collected from at least one removable pod, out of the plurality of removable pods, at a known location and time.

6. The method of claim 1, wherein determining the time stamps for each instance of the respective environmental data and the time stamps for each instance of the corresponding vehicle data comprises:
determining computing device time stamps for at least one instance of the environmental or vehicle data, and
determining the time stamps for the at least one instance of the environmental or vehicle data based on having the computing device time stamps synched with time stamps from one or more sensors, or a printed circuit board (PCB), of the respective removable pod.

7. The method of claim 1, wherein the respective aggregation of the time stamped instances of environmental data and the time stamped instances of corresponding vehicle data for the respective removable pod is generated with an external data source.

8. The method of claim 1, wherein the unique vehicles include at least two vehicles of different vehicle types.

9. The method of claim 1, wherein the unique vehicles include vehicles having variations and within a vehicle type.

10. The method of claim 1, wherein the plurality of removable pods are vehicle-agnostic.

11. The method of claim 1, wherein more than one removable pod is attached to a vehicle, of the unique vehicles.

12. The method of claim 1, wherein the plurality of removable pods are each mounted at a valid position of a corresponding vehicle to allow sensors of the plurality of removable pods to collect data from a known predefined perspective.

13. The method of claim 1, wherein the unique vehicles include the autonomous vehicle or an additional autonomous vehicle.

14. A method of collecting diverse driving data, the method comprising:
receiving, at a remote server and for each of a plurality of removable pods that are each respectively attached to a unique vehicle in an environment, a respective aggregation of time stamped instances of environmental data and vehicle data,
wherein each of the vehicles is attached to at least one removable pod;
aggregating, at the remote server, the time stamped instances of vehicle data and environmental data from the plurality of removable pods,
wherein prior to receiving the aggregations for the plurality of removable pods, and for a respective removable pod of the plurality of removable pods,
respective environmental data of the environment is collected using one or more sensors of the respective removable pod,
the respective environmental data and corresponding vehicle data is recorded,
the time stamps for each instance of the respective environmental data and time stamps for each instance of the corresponding vehicle data are determined using a respective computing device connected to the respective removable pod, and
a respective aggregation of the time stamped instances of respective environmental data and the time stamped instances of corresponding vehicle data is generated using the respective computing device;
generating training data for a machine learning model based on the time stamped instances of vehicle data and environmental data from the plurality of removable pods; and
training, based on the training data, the machine learning model, to generate control signals for an autonomous vehicle.

15. The method of claim 14, wherein the respective environmental data and corresponding vehicle data for the respective removable pod is recorded using the respective computing device that is connected to the respective removable pod.

16. The method of claim 14, wherein the respective environmental data and the corresponding vehicle data for the respective removable pod is recorded on a separate storage device operatively connected to a vehicle cabin removable pod hardware of the respective removable pod.

17. The method of claim 14, wherein the multiple vehicles each being a non-autonomous vehicle that are collecting data in the environment with the autonomous vehicle or an additional autonomous vehicle.

18. The method of claim 17, further comprising:
automatically labeling data collected from the autonomous vehicle or the additional autonomous vehicle using data collected from at least one removable pod, out of the plurality of removable pods, at a known location and time.

* * * * *